Patented May 30, 1933

1,911,205

UNITED STATES PATENT OFFICE

WILLIAM D. RICHARDSON, OF CHICAGO, ILLINOIS, ASSIGNOR TO SWIFT & COMPANY, OF CHICAGO, ILLINOIS, A CORPORATION OF ILLINOIS

TREATMENT OF GELATIN STOCK

No Drawing.    Application filed March 6, 1929.    Serial No. 344,930.

This invention relates to a new and improved process for preparing gelatin and/or glue from collagen-bearing materials and to an improved gelatin product having qualities which are especially adapted for photographic and candy making purposes.

In the methods heretofore used for preparing gelatin, the collagen-bearing materials, such as hides or other raw materials, after having been washed free from dirt and adhering impurities, are first treated with milk of lime. This treatment is performed by soaking the raw materials in milk of lime in pits for a period which may vary from several weeks to several months, during which period the mass of hides and lime solution must be frequently agitated either mechanically or by means of compressed air.

The lime softens and swells the hide tissue, saponifies the fat and dissolves in large part adhering materials which do not form gelatin or glue. When the softening and swelling process has reached the desired stage, the stock is thoroughly washed to remove, so far as possible, the lime and dissolved impurities from the stock and the washing treatment may be followed by acid treatment (hydrochloric, oxalic, sulphurous to further and more quickly remove the lime and to bleach the stock (sulphurous).

Caustic soda has also been used for this preliminary treatment but never to any great extent, as compared with the lime process.

The washed stock is ordinarily treated with sulfurous acid, which cleanses and bleaches the stock and at the same time swells the hide. The hide is then ready for the cooking treatment, which converts it into a gelatin solution. This treatment may be effected by heating with water or steam until conversion of the collagen into gelatin is substantially complete. It is customary, however, in order to avoid deterioration of the gelatin which is first converted, to cook the stock in successive baths, drawing off from time to time the gelatin which has already been converted and dissolved, and replacing the solution with additional water.

The resulting liquors are freed from scum, etc., and filtered to remove all suspended impurities and are then evaporated, chilled and dried to produce glue or gelatin as may be desired. Since these steps are well-known in the art and are not essentially changed when practicing my invention, they need not be further described.

During the past few years there has been an increasing use of pork skins for the manufacture of gelatin. These skins constitute a very desirable raw material for gelatin manufacture because they are obtainable from United States Government inspected packing houses and are therefore an edible product from the beginning of operations. In the treatment of pork skins for gelatin manufacture, it has been customary to use a so-called quick cure process, making use of suitable acids such as phosphoric, hydrochloric or sulphuric. By use of this acid cure, the very great advantage has been brought about that a very short curing period is sufficient. However, the resulting gelatin is not satisfactory for all purposes and especially is not suited for use in high speed photographic emulsions.

In the liming process there are inherent several objectionable features. In the first place the very long period required for soaking in the liming pits requires a very large investment in apparatus and consequently a high overhead expense in the manufacturing process. Calcium hydroxide has only a slight solubility in water, amounting to about 0.18% at the ordinary temperatures used for curing the raw stock from which gelatin is made. On account of the low solubility and also because the calcium hydroxide molecule is of relatively great size and weight, the penetration by osmosis into the collagenous tissue is decidedly slow and at the end of the curing period when the stock is washed, the lime can be removed only with equal difficulty. Even with considerable washing and acid treatment, a considerable amount of lime salts will usually remain and appear in the finished gelatin. For many purposes the presence of lime in the gelatin is undesirable and the quality of the gelatin may be judged by its low ash content.

According to my invention the raw material, instead of being cured by any of the acids or alkalies heretofore used, is treated with ammonia and by this means practically all of the disadvantages resulting from lime treatment or acid treatment are obviated.

The solubility of ammonia in water is so much greater and the size of its molecule smaller than that of calcium hydroxide, that its penetration into the stock may be controlled almost at will by simply regulating the concentration of ammonia. Thus the time required for the curing process may be cut down to a minimum, especially in the case of cut or shredded stock and by using a concentration of ammonia in the neighborhood of from 1% to 5%, the curing time can be reduced to 24 hours or even less. Thus the advantages of the acid cure can be attained without the attendant disadvantages of inferiority of the gelatin produced. Quite on the contrary the gelatin produced by the present process is superior to any that has been commercially available heretofore, particularly in that it has better whipping qualities for candy making, etc. and also has better photographic qualities; and furthermore, since the ammonia contributes nothing to the ash content of the final product, the ash content is at a minimum and substantially below that of other processes.

It is not possible to predict in advance exactly what quality of gelatin will be produced by any given process, because the factors which determine the properties of the gelatin during the course of manufacture are still to a large extent unknown. However, I have found that under similar conditions the gelatin produced by my process is consistently superior to the gelatin produced by the older processes.

The following specific example will illustrate the manner in which my invention may be practiced:

Calf trimmings or pork skins, preferably cut or shredded, after a preliminary washing are placed in a plumping pit similar to those which are used in the customary liming process or in a washer or rotating drum; and an amount of ammonia solution is added just sufficient to well cover the stock after plumping has proceeded to a maximum. This amount is usually about four times the weight of moist raw stock but the exact amount will vary according to the stock being used and must be determined by previous experience with similar material. The strength of the ammonia solution is about 1% to 2%.

This treatment is continued with occasional stirring by means of a suitable mechanical device for a period from 36 to 72 hours, after which the plumped stock is washed with water. This washing treatment is such as to remove a portion of the excess ammonia but to leave a moderate amount of ammonia in the stock in order to promote the hydrolysis of the collagen during the subsequent cooking operation. Or the ammonia may be entirely removed by washing or by acid treatment as described below.

Cooking is commenced at low temperatures, e. g., about 130° F. to 150° F. and is continued with successive portions of water until the maximum gelatin extraction is obtained.

The liquors may be chilled directly if of a sufficient concentration or they may be concentrated in a vacuum evaporator and thereafter chilled in pans or on a chilling belt. The chilled material is dried in tunnels in the usual manner, or the product may be dried on a drying wheel without pre-chilling.

The curing solution drawn off at the end of the plumping operation may be reused with addition of sufficient ammonia to build up its strength to the required point. If it is not desired to reuse the curing solution or when, after repeated reuse the impurities have built up to an objectionable degree, the ammonia may be recovered therefrom, for example, by adding caustic lime and boiling the solution until the ammonia is substantially all driven off. The ammonia removed in this manner from residual curing liquors may be absorbed in cold water to form a fresh ammonia solution for use in curing additional material.

While I have specified in the above example an ammonia concentration of from 1% to 2%, more or less of this may be used with decreased or increased time of cure. Thus, with 3% to 5% the time of the cure may be reduced to 20 hours or even less, while with as little as ¼% the time required may be from 30 hours to several days, depending on the stock used. Ordinarily I have found that a concentration of between 1% and 2% produces the best results, considering economy.

The exact time of the cure cannot be definitely predicted. The end of the cure is determined as with present processes by the judgment of the operator based on the usual criteria, including the feel of the stock when squeezed in the hand, the amount of plumping as judged by the eye and tests made on a cut piece of the stock by use of suitable chemical indicators. With an ammonia liquor of 1% to 2% concentration and 4% to 8% total ammonia, based on the weight of the raw material, the time will ordinarily be about 40 hours but may vary from 24 to 72 hours.

The amount of ammonia liquor which is used should be just sufficient to well cover the stock, with an additional amount sufficient to keep the stock covered after plumping has proceeded to a maximum. The amount necessary must be learned by a previous trial and experiments with similar raw materials but is usually in the neighborhood of four times the weight of the moist raw stock and should be such that the total ammonia present is about 3% to 8% or preferably 4% to 5% of the weight of the raw material, before the liquor is added. However, more or less may be used according to circumstances, without seriously impairing the improved results obtained by this process.

The use of a liming pit as described above will ordinarily be desirable, particularly because these are already available as apparatus used in the customary processes. However, where such pits are not already available and particularly where high concentrations and correspondingly short periods of treatment are being used, the treatment may be carried out to advantage in a washer such as the drum washers which are commonly used in the leather and glue industries. In such case, agitation is secured by rotating the washer from time to time, or the process may be conducted in an ordinary roller washer.

The following example illustrates more specifically one manner in which my invention may be used:

Ten thousand pounds of raw material consisting of pigskins cut into strips varying from one-half inch to one and a half inches wide are introduced into a roller washer about 20 feet in diameter by 4 feet deep. An amount of ammonia solution about four times by volume that of the raw stock and containing on the basis of actual weight of the stock from 3% to 8% of ammonia ($NH_3$) is next introduced into the washer and the roller started rotating. Under these conditions the treating period is from 36 to 50 hours, with an average of about 40 hours. At the end of the treating period the ammonia solution is run off and the treated stock is washed several times after introducing fresh water, the wash water in each case being run off before fresh water is added. After this washing there still remains a small quantity of ammonia in the interior of the pieces.

In order further to reduce the treating period the stock is next covered with a dilute solution of sulfuric acid containing about 0.7% of 60° Bé. sulfuric acid on the basis of the actual original weight of the raw stock. Agitation is continued intermittently for from 3 to 5 hours and the penetration of the acid is determined by cutting sections of the treated stock and applying a suitable pH indicator, such as chlor-phenol red, which has a pH range of from 5.0 to 6.6. With this indicator a yellow shade is produced on the inside of the skin to a certain depth, but between the outer and inner surfaces of the skin there will be a layer containing a small amount of ammonia which shows rose red. By judging the thickness of this interior layer the proper completion of the acid treatment is determined. When the yellow and red layers are approximately equal in thickness, or when the average of several pieces shows this equality, the acid treatment is complete. This treatment usually requires from three to five hours and must be carefully watched and controlled in the manner indicated. The acid liquor is drained off and the stock flushed with fresh water for five to ten minutes. The flush water is drained off, fresh water added and the stock allowed to soak overnight with occasional agitation. At the end of the soaking period the pH of the stock as judged by such an indicator as brom cresol green should be from pH 4.7 to pH 4.9. The pH of the liquor at this point may be judged by such an indicator as methyl red. If the pH is below 4.7 the stock is given another wash. After the last wash is drained off the stock is removed to the cooking kettles.

As is customary in cooking out gelatin several runs are made from the cooking kettles. For the first run the temperature is brought up to a point not to exceed 130° F. and the cooking continued for from two to four hours, when the gelatin liquor from this cook is drained off and fresh water added. For the second run the temperature is raised to 140° F. and the cooking continued for three to four hours, the gelatin liquor being again run off and fresh water added. For the third cook the temperature used is about 150° F. and the time about four hours. Successive runs are made up to seven or eight, the final temperature reached being 190 to 200° F. and the time period five or six hours.

As an alternative method of cooking the temperature for the first run may be raised to a higher point than 130° F., for example, to 150° F. and the cooking prolonged beyond the usual period. This procedure has a tendency to produce more concentrated gelatin liquors and the resulting gelatin has lower jelly strength and viscosity than when the cooking is performed at a lower temperature. Such concentrated liquors may be jelled and dried after filtration without further concentration. A similar procedure may be followed for the second and third runs, the temperature being raised respectively to 160 to 170° F. and 170 to 180° F. When using either cooking procedure as indicated, the gelatin from some of the runs, especially the earlier ones, may be chilled, cut and dried without concentration. Various runs may be combined, concentrated in a vacuum evaporator and then chilled and dried.

While I have described cooking the treated stock at a pH of 4.7 to 5.0, I do not wish to be restricted to this range. The cooking may be done at any customary pH over a range from 4.0 to 6.0, suitable adjustment by acid being made to suit each particular case.

In addition to the unusual photographic properties of this gelatin and its special usefulness for candy making, it possesses unusual strength and viscosity. Tested with the Bloom Jelometer according to the standard methods of the Gelatin Association, the jelly strength of the first three runs may be as high as 300 grams, or even higher, with a viscosity of 70 to 80 millipoises. This combination of strength and viscosity is unusual in gelatin manufactured by previous methods.

After the liquors are drawn off from the cooking kettle and prior to concentration or chilling, they are filtered either through the customary gelatin filters or ordinary filter-presses. In both cases the filtering machinery should be constructed of aluminum, thus avoiding contamination by contact with iron and especially with copper, which seriously affects photographic speed. Throughout the process there should be no contact with any material constructed of materials other than wood, aluminum or other non-corrodible material.

While the chemistry of the present process is not thoroughly understood, it seems likely that the ammonia has a purifying action in that it tends to dissolve proteins other than collagen and hence to eliminate them prior to the cooking treatment. It is not impossible that the ammonia combines to some extent with the collagen proteins; but the combination, if it occurs, apparently is not such as to modify to any considerable extent the nature of the gelatin which results from the present process.

The production of gelatin of uniformly high quality is perhaps the most important feature of my invention. By the old calf skin lime process a uniform product was never attained. The process was not subject to close control either with respect to raw materials or the processes, chemical and bacterial, which went on in the lime pits. My process approaches more closely a definitely controlled chemical process than any previously devised for the manufacture of photographic gelatin. Starting with a raw material of a definite kind, such as pig skins, the procedure is comparatively rapid, definite and under control at all times. In this way gelatin of definite and uniform properties can be produced.

Although I have referred in the above to gelatin specifically, it will be appreciated that my process is also applicable to the manufacture of glue.

I claim:

1. In the manufacture of gelatin the novel step which comprises treating the raw stock with an amount of ammonia equal to about 3% to 6% of the weight of the raw stock dissolved in an amount of water sufficient to keep the stock submerged throughout the treatment.

2. In the manufacture of gelatin the novel step which comprises treating the raw stock with a 1% to 5% concentration of ammonia in water, the amount of such solution being about four times the weight of the raw stock and the treatment being continued at ordinary temperatures until the desired plumping is attained.

3. In the manufacture of gelatin the method of curing the raw stock prior to extraction which comprises cutting the raw stock and subjecting the stock to a preliminary treatment with an aqueous ammonia solution for plumping the stock, said solution having a concentration of ammonia in excess of 1%, and subsequently neutralizing the ammonia prior to extraction.

4. In the manufacture of gelatin the cyclic process which comprises treating raw stock with an aqueous ammonia solution until the desired plumping is attained, removing excess liquor from the treated stock then adding ammonia sufficient to bring this excess liquor up to the required strength, repeating the process with such regenerated liquor until an objectionable amount of impurities has accumulated in the liquor and thereafter removing remaining ammonia from the residual liquor.

5. The method of producing gelatin from collagenous material which comprises plumping said material in an aqueous solution of ammonia, removing excess ammonia liquor and thereafter cooking the plumped material with water whereby the collagen is hydrolyzed to gelatin.

6. The method of manufacturing gelatin from collagenous materials which comprises plumping said material in an aqueous ammonia solution, removing excess ammonia liquor but leaving some free ammonia still in the stock and hydrolyzing the collagen to gelatin by cooking in the presence of such remaining ammonia.

7. The method of manufacturing gelatin from hides, skins, etc., which comprises plumping the raw stock in an aqueous ammonia solution, washing the plumped stock, treating the washed stock with dilute acid until a freshly cut section treated with chlorphenol red shows a red layer and yellow layers of approximately equal thickness, washing the stock to prevent further reducing the pH value and thereafter cooking the treated stock in the presence of water to convert it into gelatin.

8. The method according to claim 5, of producing high grade gelatin adapted for use in high speed photographic emulsions, in which contamination of the stock by contact with corrodible metals is prevented.

9. The method according to claim 5 in which the first stage of the cooking step is continued until the concentration of dissolved gelatin is sufficient to permit chilling and drying without further evaporation of the liquor and thereafter chilling and drying the liquor to produce commercial gelatin.

10. The method according to claim 5 in which the cooking treatment comprises heating the plumped material with fresh water to a temperature not exceeding about 130° F. for a period of about five to six hours, separating the resulting liquor from the undissolved material, chilling and drying the liquor without further evaporation and subjecting the remaining undissolved material to a further heating with fresh water.

11. A process of producing gelatin which consists in treating collagenous material with dilute ammonia, removing excess ammonia by washing, neutralizing residual ammonia, adjusting the pH of the stock to any desired point from 4.7 to 5.0, rewashing the stock to remove excess acid, cooking the stock in the presence of water at temperatures between 130° and 190° F. and concentrating, chilling and drying the gelatin solution thus obtained.

In testimony whereof I affix my signature.

WILLIAM D. RICHARDSON.